United States Patent

Okada et al.

[11] Patent Number: 5,915,894
[45] Date of Patent: Jun. 29, 1999

[54] CORE DRILL

[75] Inventors: Kunio Okada; Tatsuo Minaka; Hiroyuki Matsubara, all of Hiroshima, Japan

[73] Assignee: Consec Corporation, Hiroshima, Japan

[21] Appl. No.: 08/957,271

[22] Filed: Oct. 24, 1997

[30] Foreign Application Priority Data

Nov. 1, 1996 [JP] Japan ................................ 8-291466

[51] Int. Cl.$^6$ ............................................... B23B 41/02
[52] U.S. Cl. ............................................ 408/204; 408/76
[58] Field of Search ........................... 408/204, 130, 408/702, 76; 279/16

[56] References Cited

U.S. PATENT DOCUMENTS

| | | | |
|---|---|---|---|
| 2,881,589 | 4/1959 | Hitt et al. | 408/130 |
| 2,932,194 | 4/1960 | Buck | 408/76 |
| 2,947,205 | 8/1960 | Wilson | 408/130 |
| 3,062,008 | 11/1962 | McCormick | 408/130 |
| 3,546,976 | 12/1970 | Clapp et al. | 408/130 |
| 3,596,558 | 8/1971 | Rydell | 408/76 |
| 3,827,510 | 8/1974 | Mazepa | 279/16 |
| 4,208,154 | 6/1980 | Gundy | 408/204 |
| 5,316,416 | 5/1994 | Kim | 408/204 |
| 5,733,074 | 3/1998 | Stock et al. | 408/204 |
| 5,794,724 | 8/1998 | Moller | 408/76 |

FOREIGN PATENT DOCUMENTS

| | | |
|---|---|---|
| 58-49207 | 3/1983 | Japan. |
| 7-2013 | 1/1995 | Japan. |

*Primary Examiner*—Andrea L. Pitts
*Assistant Examiner*—Adesh Bhargava
*Attorney, Agent, or Firm*—Flynn, Thiel, Boutell & Tanis, P.C.

[57] ABSTRACT

A core drill of dry type used for drilling through concrete structure or the like. A main shaft 23 rotatably driven by a motor 33 with a fan 32 is provided with a rubber ring 27 for allowing axial vibration of the shaft, and loosely supported by bearings 25 and 26 with a clearance between them so that it can be slightly tilted in the lateral and transverse directions. During drilling, a spacing between a diamond tip in a leading end of the core bit and a concrete structure or the like is changed as the core bit is moved in the vertical direction and tilted in the lateral and transverse direction, and chips produced by the drilling operation are efficiently discharged by injecting air from the fan 32 through an axial bore 22 in the shaft 23.

15 Claims, 6 Drawing Sheets

CORE DRILL

BACKGROUND OF THE INVENTION

The present invention relates to a core drill, particularly of dry type, used for drilling through various concrete structures, asphalt, blocks, stone materials, rocks, tiles and the like.

A conventional core drill of such type generally comprises a base fixed to a concrete structure or the like by an anchor bolt, a pole provided upright from the base and formed with a rack, a drill head attached to the pole for vertical movement and containing a pinion that is engaged by the rack, a cylindrical core bit removably attached to the drill head, a motor with reduction gears provided in the drill head for rotatably driving the core bit and a handle for rotationally operating the pinion, wherein drilling through a concrete structure or the like is generally achieved by fixing the base to the concrete structure or the like by an anchor bolt, then pressing the handle, forcing the core bit against the concrete structure or the like, and applying a thrust while the core bit is rotated by driving the motor, and cooling water is applied, in most cases, to a drilled portion during a drilling operation.

Although the application of cooling water is for cooling a diamond tip that is fixed to a leading end of the core bit, allowing chips that are produced during the drilling operation to be discharged, and preventing dispersion of dusts, the vicinity of a drilled portion is submerged by the water. Thus, in such places where flooding of water is undesired as indoors, a water retaining pad is employed for circumferentially enclosing the concrete structure so that the water is retained within the pad, and prevented from flowing out. Even though such water retaining pad is employed, as soon as the drilling operation is completed, the cooling water flows out through the hole. For example, in the case a hole is drilled through a floor, as soon as the drilling operation is completed, the water flows out to the lower floor, and the lower floor is submerged by the water. In addition, such wet core drill using cooling water is difficult to be employed in drilling through a ceiling or a wall at a high position where retention of water is difficult, and cannot be used if such water supply facility as public water supply and water tank is unavailable.

A dry core drill adapted to achieve cooling of a diamond tip and discharge of chips by air injection to or air suction from a drilled portion, instead of using cooling water, is known.

A dry core drill with a vacuum suction device for allowing a diamond tip to be cooled and chips to be discharged by air suction within a core bit during a drilling operation is disclosed in Japanese Publication of Unexamined Patent Application No. Sho 58-49207, and a dry core drill with a swivel joint for introducing compressed air to a core bit so that cooling of a diamond tip and discharge of chips from a drilled portion are achieved by injection of the compressed air to the drilled portion is disclosed in Japanese Publication of Unexamined Utility Model Application No. Hei 7-2013.

In dry core drills, in addition to those of a fixed type that are fixed to a concrete structure or the like during a drilling operation, those of a handy type provided with a handle, and comprising a motor with a cooling fan and a core bit rotatably driven by the motor are also provided.

Although such dry core drill as described above is advantageous in that it can be used anywhere without limitation of an applicable range, as it requires no water supply facility and no retention of water, particularly in the case of such core drill of fixed type, as a drilling operation is continued, a drilling performance tends to be reduced, because chips produced by the drilling operation are built up between a surface of a diamond tip and a concrete structure or the like, and clogging is caused. On the other hand, in the case of a core drill of handy type, since vibrations caused by a drilling operation are directly transmitted to an operator, as a leading end of a core bit is forced against a concrete structure or the like by gripping a handle during the drilling operation, the controllability is poor.

SUMMARY OF THE INVENTION

It is a first object of the invention to provide a dry core drill of fixed type capable of increasing a drilling efficiency by allowing chips to be discharged efficiently, and it is a second object of the invention to provide a dry core drill of handy type having a superior controllability.

A core drill according to a mode of the invention for achieving the first object is characterized in that a damper for absorbing vibrations is provided in a main shaft which is rotatably driven by a motor and attached to a core bit for allowing vibration of the main shaft in the axial direction during a drilling operation, and a core drill according to another mode of the invention is characterized in that a main shaft and a core bit are joined, for example, by a keying arrangement or spline so that the core bit is integrated with the main shaft in the rotating direction, and is slidable only in the axial direction, and a damper for absorbing vibrations is provided between the main shaft and the core bit for allowing vibration of the core bit in the axial direction during a drilling operation.

A core drill according to the other mode of the invention is characterized in that a main shaft rotatably driven by a motor and attached to a core bit is loosely supported by a bearing with a clearance between them so that it is tiltable slightly in the lateral and transverse directions during a drilling operation, and a core drill according to still other mode of the invention is characterized in that vibration of a main shaft or core bit is allowed in the axial direction, and slight tilting of the main shaft in the lateral and transverse directions is also allowed.

In core drills according to the modes of the invention, as a core bit may be vibrated in the axial direction, tilted in the lateral and transverse directions, or vibrated in the axial direction and tilted in the lateral and transverse directions during a drilling operation, a spacing between a diamond tip in a leading end of the core bit and a concrete structure or the like is changed, thus chips produced by the drilling operation is efficiently discharged by air injection or suction, so that undesired polishing of a leading end of the diamond tip due to clogging is prevented.

A diamond tip fixed to a leading end of a core bit comprises diamond grains joined by a bond so that an integral structure containing diamond grains is provided, but in order to achieve a high efficiency in a drilling operation by allowing the diamond grains to cut deeply into a concrete structure or the like, and produce large chips, it is required to promote such self-renewing effect that the bond is efficiently removed, and the diamond grains are exposed successively. Because a core bit is vibrated axially, tilted in the lateral and transverse directions, or vibrated vertically and tilted in the lateral and transverse directions so that chips are efficiently discharged by air injection or suction, and the self-renewing effect of diamond grains is promoted, the drilling efficiency is increased. As a result, a drilling operation is efficiently achieved without application of a high pressure to a core bit, and overheating of a core bit can be avoided.

In core drills according to above modes of the invention, air suction or injection is provided during a drilling operation by air suction or injection means comprising, for example, a compressor, fan or compressed air cylinder, and such suction or injection means is preferably incorporated in the core drill, although it may be provided separately from the core drill. In such manner, an entire apparatus comes to be compact, and can be easily transported. In the case a fan is incorporated in a core drill, the fan is driven by a motor for rotatably driving the core drill, preferably attached to an output shaft of the motor, and driven thereby. Then, by driving the fan, the air is discharged from or injected into a core bit.

When the air is suctioned from or injected into a core bit by a fan, a flow regulating valve is preferably employed in an air channel, so that a rate of air suction or injection can be adjusted according to a driving condition.

A damper used in the invention may be such resilient member 73 as rubber or in the form of a disc spring or coil spring attached to a large-diameter portion 71a that is formed in a main shaft 71 or a main shaft 71 between a collar that is fixed to the main shaft 71 and a bearing 72 as shown in FIG. 7, or in the form of a cylinder 76 linked with a main shaft 75 as shown in FIG. 8.

In a core drill according to a mode of the invention for achieving the second object, similarly to a core drill according to the modes of the invention for achieving the first object, a damper for absorbing vibrations is provided in a main shaft that is rotatably driven by a motor and attached to a core bit for allowing slight movement of the main shaft in the axial direction, and a core drill according to another mode of the invention is characterized in that a main shaft and a core bit are joined, for example, by a keying arrangement or spline so that the core bit is integrated with the main shaft in the rotating direction, and is slidable only in the axial direction, and a damper for absorbing vibrations is provided between the main shaft and the core bit for allowing slight movement of the core bit in the axial direction during a drilling operation.

According to a core drill of the invention, because vibrations during a drilling operation can be absorbed and relieved by a damper, and are prevented from being transmitted directly to an operator, the controllability is increased.

In a core drill according to the modes of the invention, a damper similar to that already described is employed.

Other object and advantage of the invention will become apparent during the following description taken in connection with the accompanying drawings.

DESCRIPTION OF PREFERRED EMBODIMENTS

Figure 1:
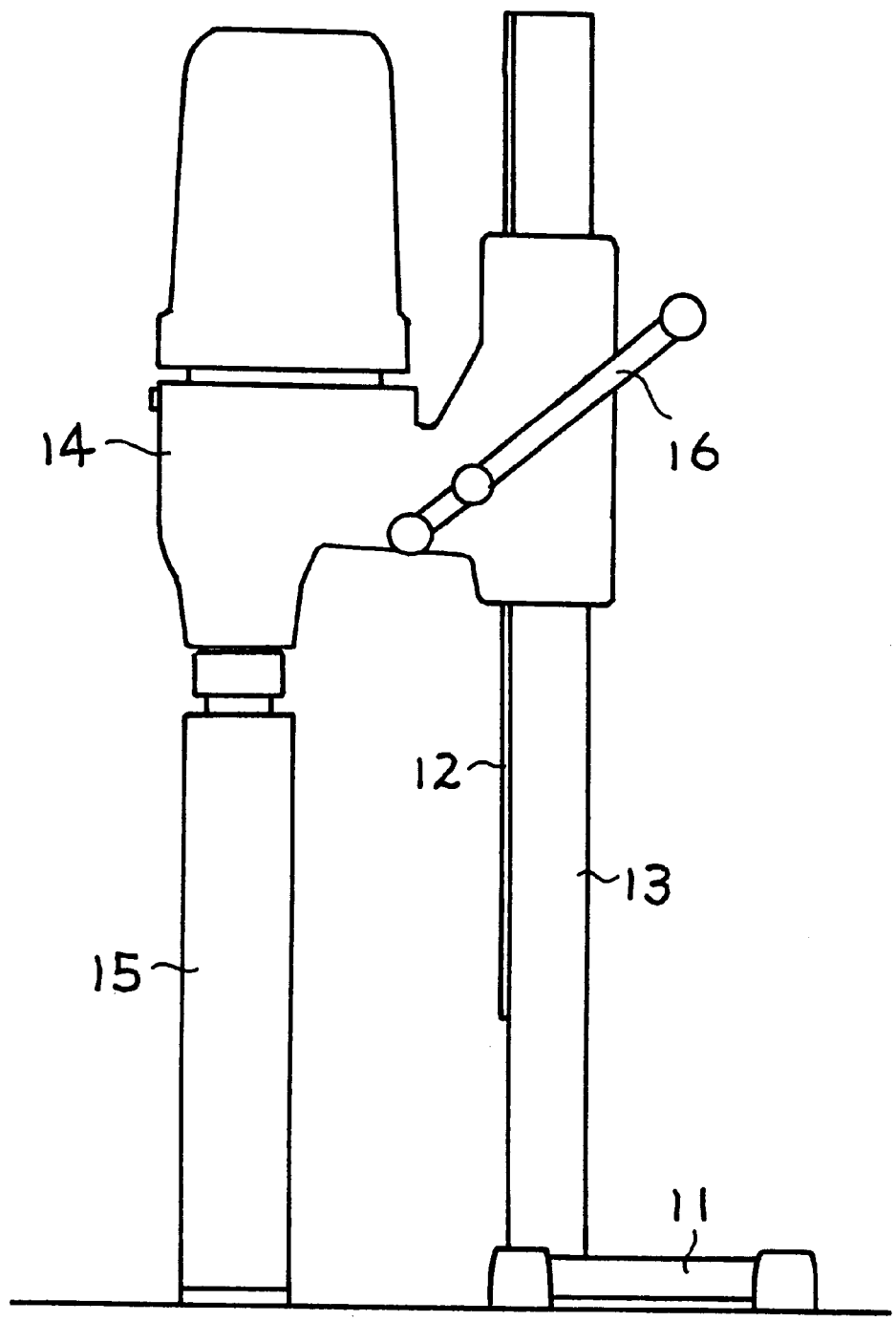
FIG. 1 is a front view of a dry core drill of fixed type according to the invention.
Figure 2:
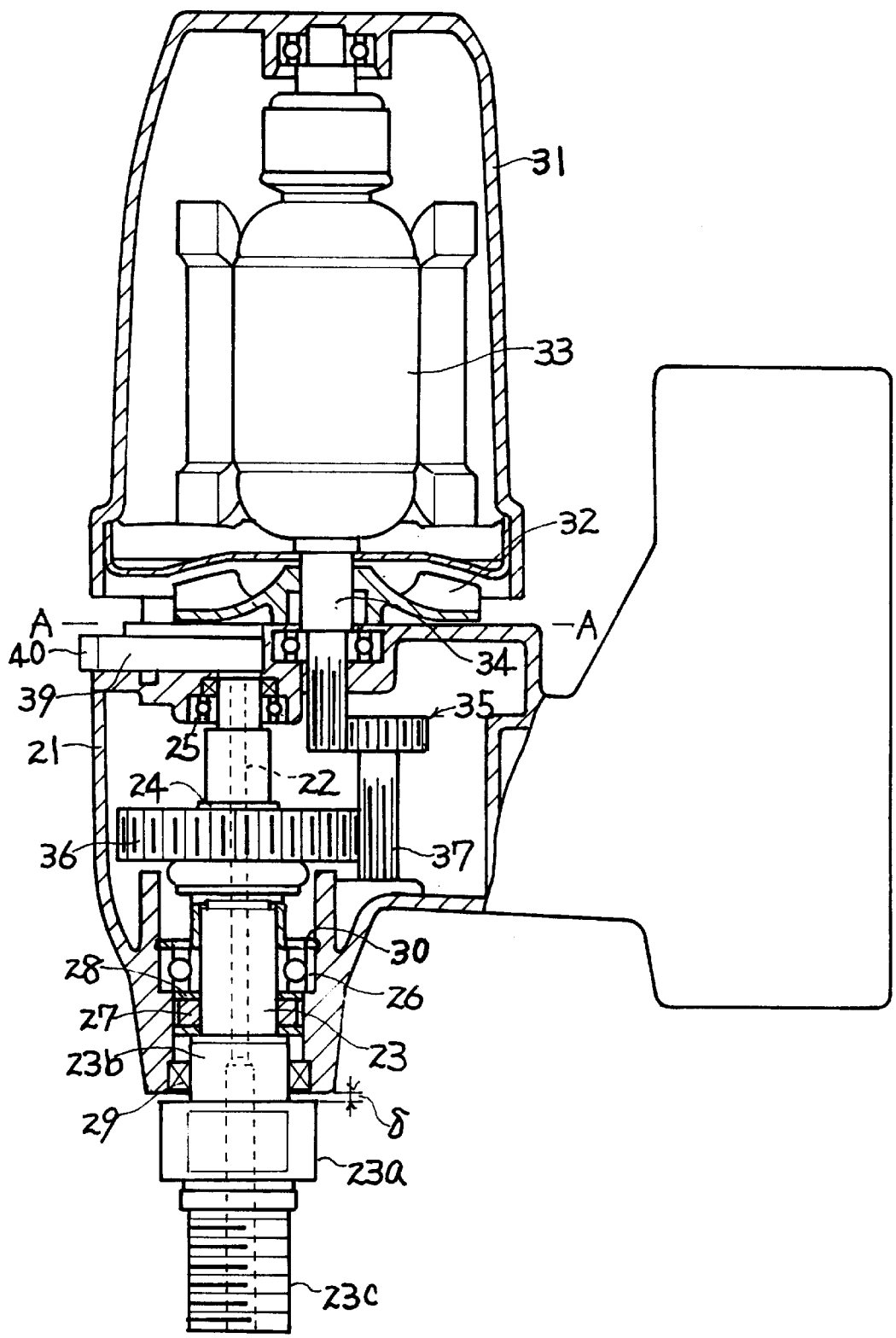
FIG. 2 is a partial sectional view of a main part of the core drill shown in FIG. 1.

FIG. 1 is an overall view of a dry core drill of fixed type, and FIG. 2 shows a drill head of the core drill, wherein the core drill comprises a base 11 fixed to a concrete structure or the like by an anchor bolt, a pole provided upright from the base 11 and formed with a rack 12, a drill head 14 attached to the pole 13 for vertical movement and containing a pinion that is engaged by the rack 12, a cylindrical core bit 15 removably attached to the drill head 14, a motor with a fan provided in the drill head 14 for rotatably driving the core bit 15 and a handle 16 for vertically moving the drill head 14 along the pole 13 by rotationally operating the pinion.

In a gear case 21 composing the drill head 14, a main shaft 23 in the form of a stepped shaft with an axial bore 22 is axially supported by a retaining ring 24 for preventing removal of the shaft, and a bearing 25 for axially bearing an upper end of the shaft and a bearing 26 for axially bearing an intermediate portion thereof are loosely fitted with a slight clearance between them. The main shaft 23 is further supported in such manner that slight movement corresponding to a spacing δ between a grip portion 23a outside the gear case 21 and the gear case 21 is allowed in the vertical direction, and a same spacing δ is also formed, for allowing the vertical movement corresponding to the amount δ of the main shaft 23, between the bearing 25 and the step of main shaft 23 and an end of the main shaft 23 and an airflow regulating lever 39 (described later), respectively.

An annular damping member 27 having a resiliency and made of a rubber or resin is attached to the main shaft 23 in conjunction with a washer 28 in either end thereof as a damper between the bearing 26 and a large-diameter portion 23b. The core bit 15 shown in FIG. 1 is attached to a lower end of the shaft. Attachment of the core bit is achieved by holding the grip portion 23a using a tool, and thread-engaging the core bit with a threaded portion 23c in the lower end of the main shaft, while the main shaft 23 is kept from rotation. Numeral 29 in the figure shows a dust seal, and 30 a retaining ring for receiving a pressure in a drilling operation.

In a case 31 attached to the top of the gear case 21, a motor 33 with a fan 32 is contained. An output shaft 34 axially supported by the gear case 21 of the motor 33 is connected with the main shaft 23 by means of a gear transmission mechanism 35 for rotatably driving the main shaft 23, and a pinion 37 in a spline tooth profile for engagement with a spur gear 36 that is fixed to the main shaft 23 is contained in the gear transmission mechanism for allowing axial movement of the main shaft 23.

Figure 3:
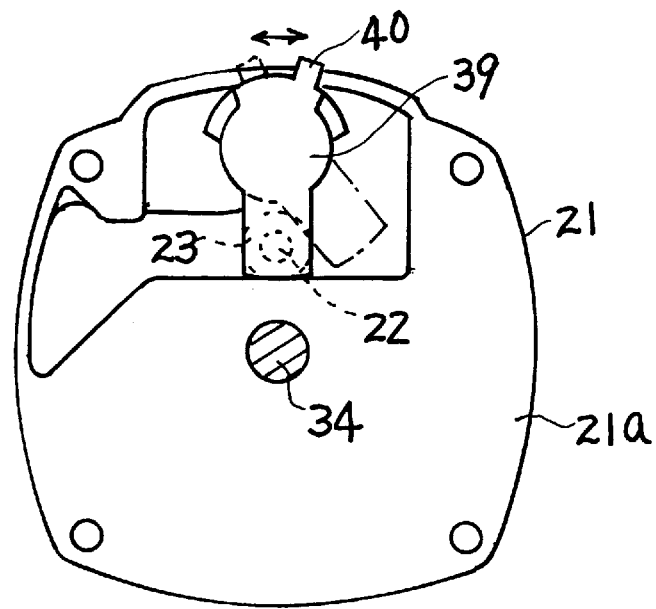
FIG. 3 is a sectional view taken along a line A—A of FIG. 2.

The airflow caused by rotation of the fan 32 is passed through the axial bore 22 of the main shaft 23, drawn into the core bit 5, and injected to a drilled portion. Then the airflow regulating lever 39 is provided over the axial bore for regulating an airflow rate through the axial bore 22. As shown in FIG. 3, the airflow regulating lever 39 is attached to a top plate 21a of the gear case 21 in such manner that it can be moved horizontally through a certain angle, and a knob 40 thereof is projected out of the gear case. Then, by operating the knob 40, and rotatably moving the airflow regulating lever 39 between a position shown by a solid line where an upper end of the axial bore is closed and a position shown by an alternate long and short dash line where the upper end of the axial bore is open, the airflow rate can be controlled.

According to such construction of the device, during a drilling operation to a concrete structure or the like, because the core bit 5 is moved slightly in the vertical direction, and tilted slightly in the lateral and transverse directions, a spacing between a diamond tip in a leading end of the core bit and the concrete structure or the like is changed, and chips produced by the drilling operation are efficiently discharged through a larger portion of the spacing by air injection. As a result, diamond grains cut deeply into the concrete structure or the like, and the drilling efficiency is increased. Then, as chips of a larger size are produced, a bond in the diamond tip is efficiently removed, and the self-renewing effect of diamond grains is promoted.

Figure 4:
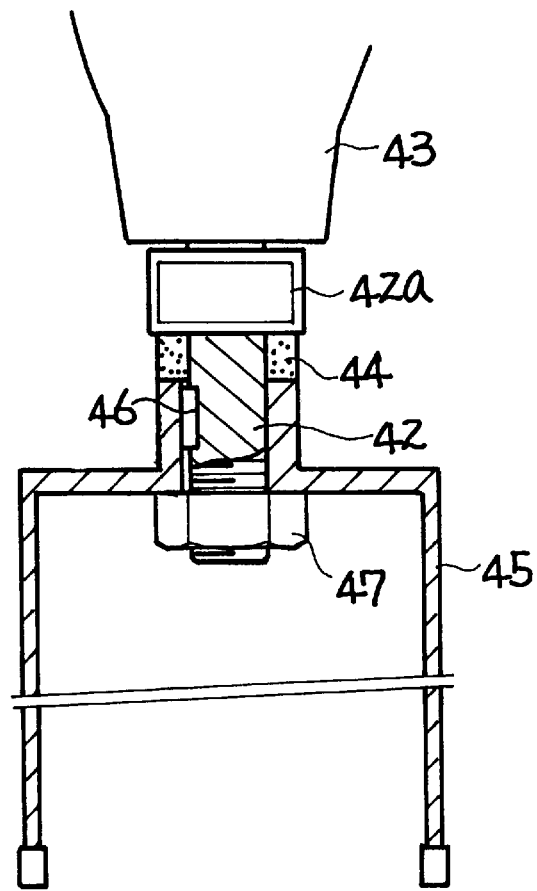
FIG. 4 is a sectional view of a main part of another embodiment of a dry core drill according to the invention.

FIG. 4 shows another embodiment of a core drill, wherein a main shaft 42 is loosely supported by a bearing with a slight clearance between them within a main body of gear case so that it can be slightly tilted in the lateral and transverse directions, as in the case of the core drill shown in FIG. 2. A core bit 45 is attached to the main shaft 42 which is projected from the gear case 43, and an annular damping member 44 made of a rubber or resin is attached to the main shaft 42 between grip portion 42a and core bit 45. The core bit 45 and main shaft 42 are joined by a keying arrangement 46 in such manner that they are integrated in the rotating direction, and are slidable with respect to each other only in the axial direction. Then, a nut 47 is fitted to an end of the shaft that is projected inside the core bit, so that the damping member 44 is retained between the core bit 43 and a grip portion 42a of the main shaft 42.

In the device as well, the core bit 43 is allowed to be slightly moved in the vertical direction and slightly tilted in the lateral and transverse directions as it compresses the damping member 44 during a drilling operation to a concrete structure or the like.

Figure 5:
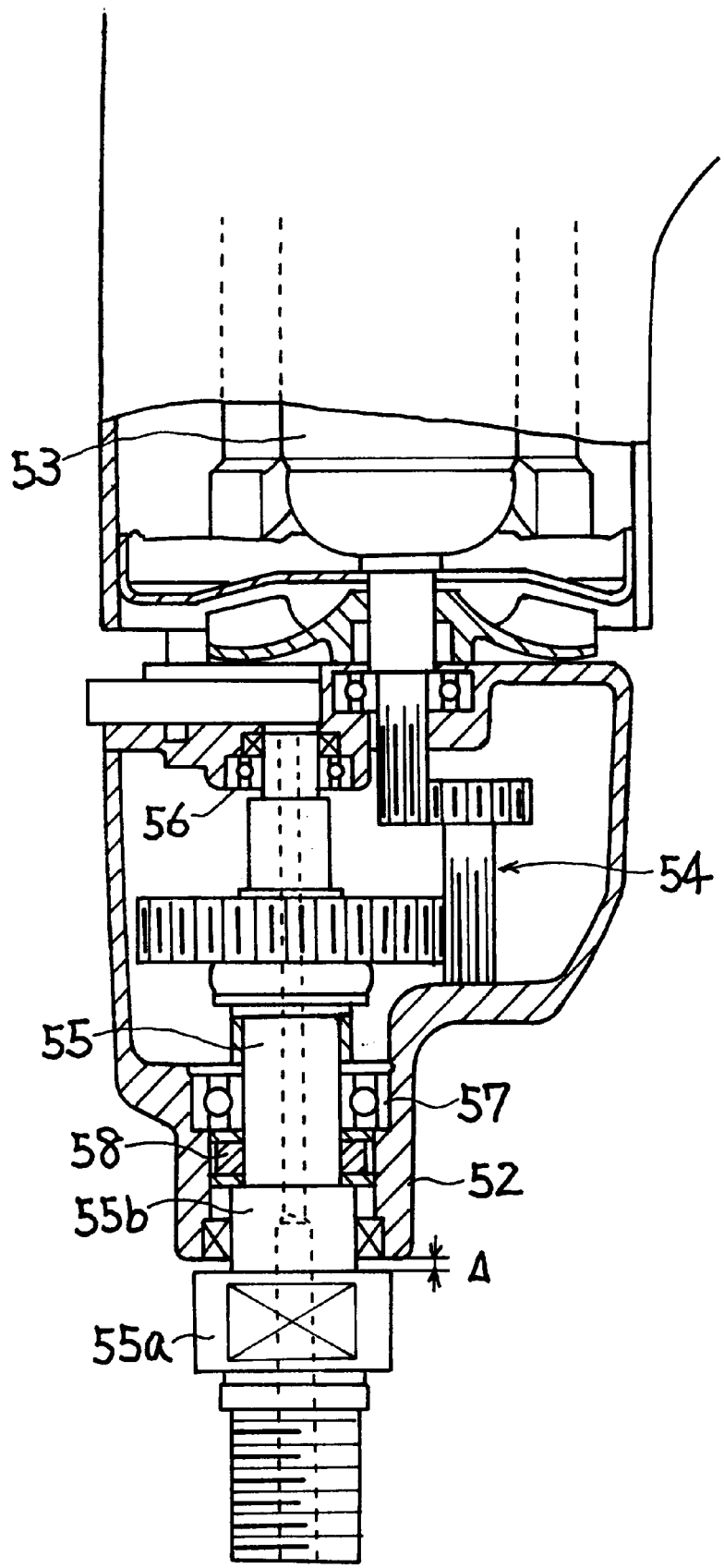
FIG. 5 is a partial sectional view of a main part of a dry core drill of handy type according to the invention.

FIG. 5 shows a main part of the core drill of handy type with a handle not shown in an upper part thereof, wherein an internal structure is identical with that of the core drill shown in FIG. 2 except that a main shaft 55 is given no clearance in relation to bearings 56 and 57, and cannot be tilted, therefore, in the lateral and transverse directions. In other words, within a casing 52, the main shaft 55 in the form of a stepped shaft rotatably driven by a motor 53 with a fan through a gear transmission mechanism 54 is axially supported, and adapted to make slight movement corresponding to a spacing $\Delta$ between a grip portion 55a and the casing 52, and the gear transmission mechanism contains spline teeth for allowing the vertical movement corresponding to the amount $\Delta$ of the main shaft 55.

The main shaft 55 is also provided with an annular damping member 58 as a damper between the bearing 57 and a large-diameter portion 55b.

Figure 6:
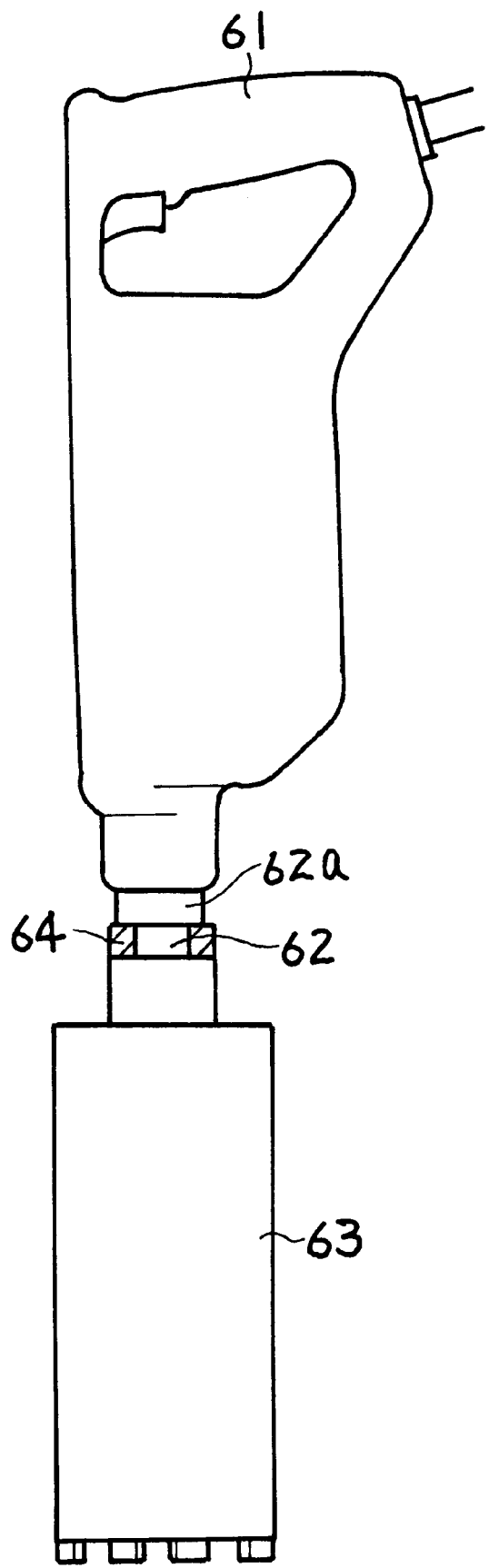
FIG. 6 is a front view partly in section of another embodiment of a dry core drill of handy type according to the invention.
Figure 7:
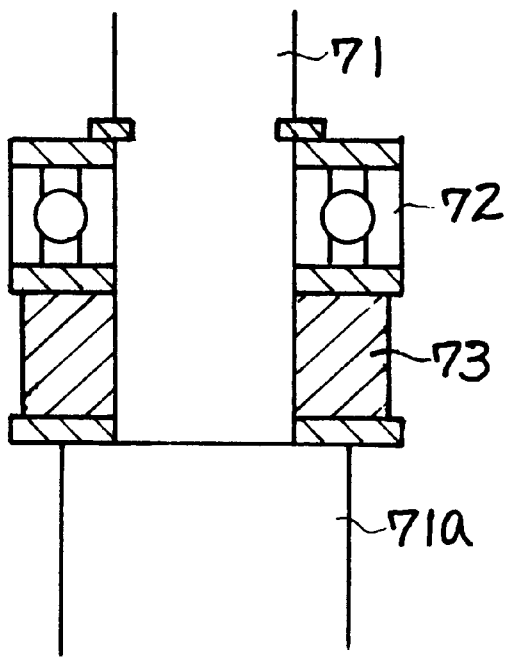
FIG. 7 is a sectional view showing an example of a damper used in the invention.
Figure 8:
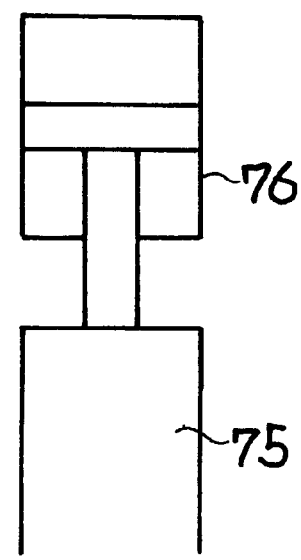
FIG. 8 is a diagram showing another example of a damper.

FIG. 6 is an overall view of a handy-type core drill with a handle 61 in an upper portion thereof, wherein a main shaft 62 is provided with an annular damping member 64 made of a rubber or resin between a grip portion 62a of the main shaft 62 and a core bit 63. In the core drill, the main shaft 62 and the core bit 63 are connected with each other in a manner similar to that of the core drill shown in FIG. 4, and only the core bit 63 can be slightly moved in the vertical direction.

In the core drills described above, vibrations caused during a drilling operation are absorbed and relieved by the damping member 58 or 64, so that vibrations transmitted to an operator are reduced. Besides, in such core drill of handy type, because a handle is held by an operator throughout a drilling operation, a core bit can be moved in the vertical, and tilted in the lateral and transverse directions. Then a spacing between a diamond tip in a leading end of the core bit and the concrete structure or the like is changed.

What is claimed is:

1. A core drill comprising a base fixed to a concrete structure or the like, a pole provided On the base and formed with a rack in a side thereof, a drill head slidably supported by the pole and incorporating a pinion that is engaged by the rack, a core bit removably attached to the drill head for fixing a diamond tip to a leading end thereof, a motor provided in the drill head for rotatably driving the core bit and air suction means for suctioning air inside the core bit or air injection means for supplying air to a drilled portion, wherein a main shaft rotatably driven by the motor and removably attaching the core bit is provided with a damper for allowing vibration in the axial direction of the main shaft.

2. A core drill comprising a base fixed to a concrete structure or the like, a pole provided on the base and formed with a rack in a side thereof, a drill head slidably supported by the pole and incorporating a pinion that is engaged by the rack, a core bit removably attached to the drill head for fixing a diamond tip to a leading end thereof, a motor provided in the drill head for rotatably driving the core bit and air suction means for suctioning air inside the core bit or air injection means for supplying air to a drilled portion, wherein a main shaft and the core bit are connected in such manner that they are integrated in the rotating direction, and are slidable with respect to each other only in the axial direction, and a damper is employed between the main shaft and the core bit for allowing vibration in the axial direction of the core bit.

3. A core drill of claim 1, wherein the main shaft is loosely supported by a bearing with a clearance between them for allowing a slight tilt thereof.

4. A core drill comprising a base fixed to a concrete structure or the like, a pole provided on the base and formed with a rack in a side thereof, a drill head slidably supported by the pole and incorporating a pinion that is engaged by the rack, a core bit removably attached to the drill head for fixing a diamond tip to a leading end thereof, a motor provided in the drill head for rotatably driving the core bit and air suction means for suctioning air inside the core bit or air injection means for supplying air to a drilled portion, wherein a main shaft rotatably driven by the motor and removably attaching the core bit is loosely supported by a bearing with a clearance between them for allowing a slight tilt thereof.

5. A core drill of claim 1, wherein the air suction or injection means is a fan rotatably driven by the motor.

6. A core drill of claim 5, wherein a flow regulating valve is provided in an air channel.

7. A core drill comprising a casing with a handle, a motor contained in the casing and a core bit rotatably driven by the motor, wherein a main shaft rotatably driven by the motor and removably attaching the core bit is provided with a damper for allowing slight movement in the axial direction of the main shaft.

8. A core drill comprising a casing with a handle, a motor contained in the casing and a core bit rotatably driven by the motor, wherein a main shaft rotatably driven by the motor and the core bit are connected in such manner that they are integrated in the rotating direction, and are slidable with respect to each other only in the axial direction, and a damper is provided between the main shaft and the core bit for allowing slight movement in the axial direction of the core bit.

9. A core drill of claim 2, wherein the main shaft is loosely supported by a bearing with a clearance between them for allowing a slight tilt thereof.

10. A core drill of claim 2, wherein the air suction or injection means is a fan rotatably driven by the motor.

11. A core drill of claim 10, wherein a flow regulating valve is provided in an air channel.

12. A core drill of claim 3, wherein the air suction or injection means is a fan rotatably driven by the motor.

13. A core drill of claim 12, wherein a flow regulating valve is provided in an air channel.

14. A core drill comprising a base fixed to a concrete structure or the like, a pole provided on the base and formed with a rack in a side thereof, a drill head slidably supported by the pole and incorporating a pinion that is engaged by the rack, a core bit removably attached to the drill head for fixing a diamond tip to a leading end thereof, a motor provided in the drill head for rotatable driving the core bit and air suction means for suctioning air inside the core bit or air injection means for supplying air to a drilled portion, wherein a main shaft rotatable driven by the motor and removably attaching the core bit is loosely supported by a bearing with a clearance between them for allowing a slight tilt thereof, and wherein the air suction or injection means is a fan rotatably driven by the motor.

15. A core drill of claim 14, wherein a flow regulating valve is provided in an air channel.

* * * * *

UNITED STATES PATENT AND TRADEMARK OFFICE
CERTIFICATE OF CORRECTION

PATENT NO. : 5 915 894
DATED : June 29, 1999
INVENTOR(S) : Kunio OKADA et al

It is certified that error appears in the above-identified patent and that said Letters Patent is hereby corrected as shown below:

Column 6, line 5; change "On" to
---on---.

Column 8, line 5; change "rotatable" to
---rotatably---.

Signed and Sealed this

Thirtieth Day of November, 1999

Q. TODD DICKINSON

Attest:

Attesting Officer

Acting Commissioner of Patents and Trademarks